United States Patent [19]

Avni

[11] Patent Number: 4,946,372

[45] Date of Patent: Aug. 7, 1990

[54] COMPOSITE PAPER

[75] Inventor: Eitan Avni, Langhorne, Pa.

[73] Assignee: Union Camp Corporation, Wayne, N.J.

[21] Appl. No.: 280,165

[22] Filed: Dec. 5, 1988

[51] Int. Cl.⁵ .................... B32B 5/16; B32B 27/10
[52] U.S. Cl. .................................... 428/325; 428/323; 428/331; 428/328; 428/335; 428/341; 428/342; 428/481; 428/513; 428/522; 428/207; 264/176.1
[58] Field of Search ............... 428/323, 325, 331, 328, 428/479.1, 481, 522, 513, 341, 342, 335

[56] References Cited

U.S. PATENT DOCUMENTS 4,695,503  9/1987  Liu et al. ............................. 428/518

FOREIGN PATENT DOCUMENTS 59-054598-A  3/1984  Japan .................................. 428/207

Primary Examiner—P. C. Ives
Attorney, Agent, or Firm—Edward J. Sites

[57] ABSTRACT

A composite paper is provided which is comprised of a paper substrate, a continuous thermoplastic film formed on at least one surface of the paper substrate, and a layer of an ink absorbent composite bonded to the outer surface of the thermoplastic film. The composite paper of this invention is especially useful as a printing substrate and in the manufacture of packages requiring printed surfaces.

20 Claims, 1 Drawing Sheet

4,946,372

COMPOSITE PAPER

BACKGROUND OF THE INVENTION

1. Field of the Invention

This invention relates generally to a composite paper, and more particularly to a plastic-coated composite paper having improved printability.

2. Statement of the Prior Art

Paper is widely used in a variety of commercially-important applications, primarily due to its unique combination of desirable properties. For example, paper has traditionally been used as a substrate for printing because its excellent acceptance of ink provides for high resolution printing. Paper is also used in a variety of mechanical applications such as in the manufacture of flexible packaging (e.g., paper bags), and in the manufacture of corrugated and solid fiber boards for use in cartons. The physical properties of paper in such mechanical applications, including its stiffness, its tensile, tear and compression strength, its dead fold characteristic (i.e., the ability of paper to accept a fold and stay in position) and its relatively low cost on a cost-performance basis, are all particularly important. Furthermore, the printability of paper in mechanical applications is generally an important feature as it is often desirable or even necessary for information to be printed on paper products such as bags and boxes.

There are also certain other properties of conventional paper which have limited its use in many mechanical applications. For example, conventional paper readily absorbs moisture and has exceptionally poor wet strength. If conventional paper is exposed to even a moderate amount of moisture, it will absorb the moisture and deform or wrinkle. This property can be a serious shortcoming in the printing of books, manuals, maps, labels and the like since the printed product may ultimately be exposed to adversely moist conditions. That is, when conventional paper is exposed to relatively high levels of moisture, or is placed in direct contact with water, or exposed to the weather, it readily absorbs any ambient water and resultingly exhibits essentially no wet strength. For most paper products (e.g., paper bags, cartons, and the like), such exposure to moisture and resulting reduction in wet strength can destroy the product's usefulness.

A further problem that is encountered with conventional paper is its relatively poor property as a vapor barrier. As a result of this property, air, water vapor, and other solvent vapors can readily penetrate through the paper making it highly undesirable for use in bags or the like to package materials.

Still another property of paper which makes it undesirable for certain applications is its ready absorption of oils and greases which makes it unsuitable for use in packaging products that contain such oil and greases.

When paper is to be coated with fillers to provide a high quality printing surface, the paper must frequently be smoothed and its porosity reduced so as to minimize the amount of coating required.

In order to avoid some of the above-noted problems, plastic films have been used recently in place of paper in traditional paper applications such as in grocery bags. Polyethylene, for example, is the most common thermoplastic resin used to prepare such plastic films. Typical plastic films have many desirable properties that have made them especially useful in selected applications, not the least of which is their water-resistance. Plastic films can in many instances be soaked directly in water without adversely affecting their strength properties. Moreover, plastic films typically exhibit excellent vapor barrier properties so as to prevent the transmission of water vapor or air. Plastic films also have excellent resistance to oils and greases. Plastic films are also smooth and non-porous.

However, plastic films have a number of distinct disadvantages which limit their use. Plastic films are extremely difficult to print, for example, because of their excellent resistance to water and oils. Conventional oil-based or water-based inks cannot be used to print on plastic film because of their poor adherence thereto. Rather, the inks that are used to print plastic films must contain relatively expensive binders and/or solvents to cause such inks to adhere to the surface of the plastic film. Notwithstanding the use of such relatively expensive binders and solvents, the print quality is often quite poor when compared to the high resolution of printing patterns that is obtainable on paper. Plastic films are also relatively weak as compared to paper on an equivalent weight and thickness basis when the paper is in a dry state. Moreover, plastic films do not have the desirable stiffness of paper nor do they have the desired dead fold characteristics of paper. On a cost-performance basis, finally, plastic film is considerably more expensive than paper.

In order to obtain the desired properties of paper as well as the desired properties of plastic without the undesirable properties of each, it has been suggested to form a plastic layer on the surface of paper and thereby improve the properties of the underlying paper layer. These attempts were not only successful to the extent of improving the moisture resistance of the underlying paper layer, but also to the extent of improving certain other related properties such as vapor barrier properties and grease and oil resistance. The paper layer contributed the required stiffness, dead fold characteristics and overall strength properties to the composite paper which were not obtainable with the plastic film by itself, but the plastic film which protected the underlying paper layer prevented the effective printing of the composite paper.

Therefore, it was recognized in the art that it would be highly desirable to have a composite plastic-paper product which would have all of the desired properties of paper and all of the desired properties of plastic, but which would also be readily printable in manners similar to conventional paper.

SUMMARY OF THE INVENTION

A composite paper is provided in accordance with the present invention comprising a paper substrate with two surfaces, a continuous thermoplastic film formed on at least one of the two surfaces of the paper substrate, the thermoplastic film having an inner surface contiguous with the at least one surface of the paper substrate and an outer surface opposed to the inner surface, and a layer of ink-absorbent particulate composition bonded to the outer surface of the thermoplastic film. The composite paper of the present invention is especially useful as a printing substrate and in the manufacture of packaging requiring barrier properties and printed surfaces.

DETAILED DESCRIPTION OF THE INVENTION

Figure 1:
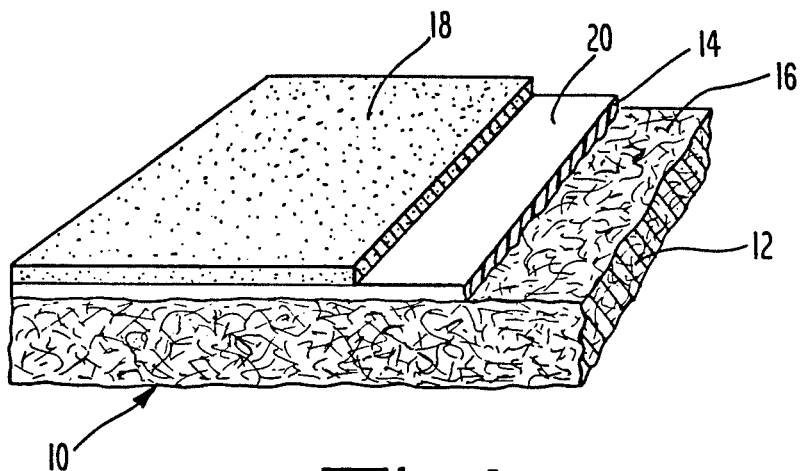
FIG. 1 is an isometric view, shown in cross-section with layers broken away for ease of illustration, of a composite paper in accordance with a first embodiment of the present invention.

Referring first to FIG. 1, a composite paper 10 in accordance with a first embodiment of the present invention is shown and comprises a paper substrate 12, a thermoplastic film 14 continuously formed on a first surface 16 of the paper substrate 12, and a layer 18 of an ink-absorbent particulate composition bonded to an outer surface 20 of the thermoplastic film 14.

Figure 2:
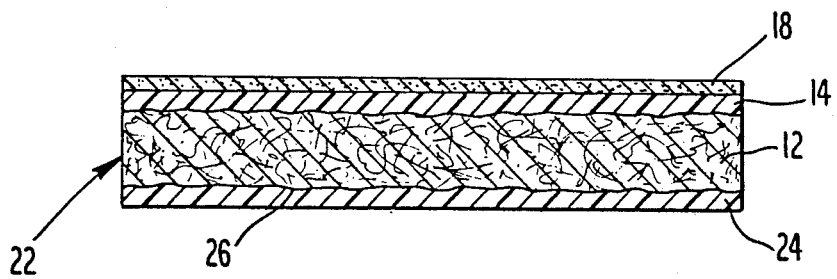
FIG. 2 is a cross-sectional illustration of a composite paper in accordance with a second embodiment of the present invention.

Another composite paper 22 in accordance with a second embodiment of the present invention, shown in FIG. 2, comprises thermoplastic films 14 and 24 continuously formed on both surfaces 16 and 26 of the paper substrate 12. Only the thermoplastic film 14 has bonded thereto the layer 18 of ink-absorbent particulate composition.

Figure 3:
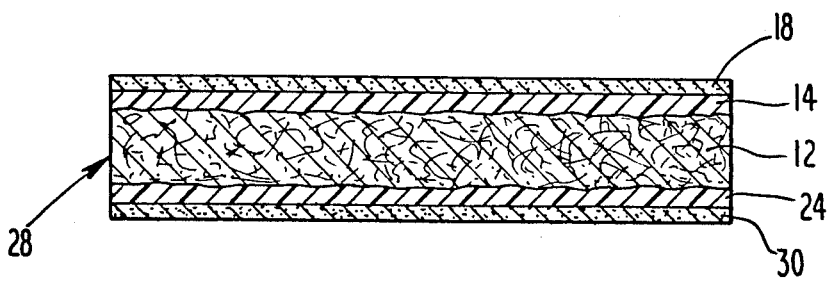
FIG. 3 is a cross-sectional illustration of a composite paper in accordance with a third embodiment of the present invention.

In accordance with a third embodiment of the present invention shown in FIG. 3, a composite paper 28 not only comprises thermoplastic films 14 and 24 continuously formed on both surfaces 16 and 26 of the paper substrate 12, the thermoplastic film 14 having bonded thereto the layer 18 of ink-absorbent particulate composition, but also comprises another layer 30 of ink-absorbent particulate composition bonded to the outer surface of the other thermoplastic film 24.

The paper substrate 12 used to prepare the composite papers 10, 22 and 28 of the present invention can be selected from a wide range of paper types and weights. One type of paper which has been found to be most preferable for use in accordance with the present invention is kraft paper due to its generally excellent overall physical properties.

Kraft papers which may be selected are either bleached or unbleached, depending upon the particular end use of the final product. For example, if the final product is to be used in printing applications (e.g., preparation of books, catalogues, displays or the like), it is generally preferable to start with a bleached kraft paper to provide a substantially white paper substrate 12. In applications where the final product color is not a critical factor, it is preferable to use unbleached kraft paper for the paper substrate 12 because of its lower cost.

Thermomechanical pulp, ground wood, or blends of these materials and with other types of fibrous materials may also be used to make the paper substrate 12. While it is preferable that the paper substrate 12 comprise only fibrous materials, it is also possible to use paper substrates 12 which contain fillers or pigments, or which have been coated so long as such fillers, pigments and coatings do not adversely affect the quality of adhesion of the thermoplastic films 14, 24 to the paper substrate 12.

The basis weight of the paper substrate 12 which is selected is dependent upon the intended end use of the final product. For example, the paper substrate 12 can be relatively light in weight kraft paper (e.g., about 20 pounds per 3,000 square feet) to relatively heavy in weight linerboard (e.g., as heavy as 90 pounds per 1,000 square feet). There are no strict limitations as to the particular basis weight of the paper substrate 12 that can be employed in accordance with the present invention, except that the paper substrate 12 must have sufficient basis weight to impart desired paper properties to the composite paper 10, 22 or 28. As is readily apparent, equipment and processes utilized for the treatment of the different weight papers must be adjusted to accommodate for the differences in handling properties.

The paper substrate 12 can be prepared with a relatively light amount of calendering. The calendering ideally should be limited to the amount required to provide a uniform caliper to the paper substrate 12.

The thermoplastic resins which are used to form the thermoplastic films 14, 24 of the composite papers 10, 22 and 28 according to the present invention are selected so as to impart certain desired properties to the final product. An initial requirement for the thermoplastic resin is that it be a film former capable of forming continuous and preferably very thin films. The thermoplastic films 14, 24 when applied to the paper substrate 12 must be capable of imparting the required water resistance, vapor barrier properties, oil and grease resistance, and other related properties to the paper substrate 12. An additional requirement which is not required for conventional plastic paper compositions of the prior art is that the thermoplastic resin must be capable of forming a strong bond with the layers 18, 30 of ink-absorbent particulate composition to be applied on the outer surfaces of the thermoplastic films 14, 24.

A principle component of the compositions used to form the thermoplastic films 14, 24 is a thermoplastic resin or combination of thermoplastic resins in mixture or in discrete layers as produced by co-extrusion. Thermoplastic resins which can be used in accordance with the present invention include for example polyamides, polyvinyl chlorides and polyesters and other similar polymer materials. Preferably employed are those thermoplastic resins which display a strong polar characteristic as this characteristic materially assists in bonding and maintaining the ink-absorbing particulate composition to the surface of the thermoplastic films 14, 24.

As a class, the most preferred group of thermoplastic resins are the polyethylene terphthalates (PET) since they not only have the required bonding properties but also exhibit excellent polar properties for use in the present invention. The polyolefins including polyethylene and polypropylene can likewise be employed in accordance with the present invention, although they are not as satisfactory as the above-noted resins because of their non-polar characteristics. It is also possible to use mixtures or co-extruded layer structures of any of the above thermoplastic resins to prepare the thermoplastic films 14, 24. The thermoplastic composition can also contain additional ingredients such as pigments, fillers, dyes, and mixtures thereof.

In a preferred method of application, the thermoplastic composition is applied in a molten state, for example, from an extruder or co-extruder or from a hot-melt applicator. When the thermoplastic compositions are applied in this manner, they must likewise exhibit the required hot-flow characteristics so as to form smooth, continuous films on the surface of the paper substrate 12. The weight amount of the thermoplastic composition which is applied to the paper substrate can be varied over a wide range. Excellent results have been obtained with amounts from less than about 6 to about 30 pounds per 3,000 square feet per side of the paper substrate 12, and the invention is applicable down to about 2 pounds. The thickness of the resulting film is also not particularly critical providing a continuous film is obtained. Films of thermoplastic resins as low as 0.15 mils have been found to be acceptable. More typically, however, the films are applied in the range of from about 0.5 mils to about 1.5 mils thickness. It is of course possible to use thicker films of the thermoplastic composition, but the additional thickness does not materially improve the properties of the final product and the increased thickness substantially increases the material cost of the final product.

The thermoplastic composition is also applied so that the inner surface of the thermoplastic films 14, 24 will conform to the surface of the paper substrate 12, and the outer surface 20 of the resulting thermoplastic films 14, 24 will be as planar as possible. Such application provides an extremely smooth polymer surface which is highly desirable as a starting point for further application of ink-absorbent coatings.

It is also possible to apply the thermoplastic films 14, 24 as preformed sheets to the surface of the paper substrate 12 by using either adhesion bonding or thermal bonding thereby providing a laminate with the paper substrate 12.

The layers 18, 30 of ink-absorbent particulate composition which are formed on the surfaces of the thermoplastic films 14, 24 are one of the more important components of the composite papers 10, 22 and 28 of the present invention. The function of these layers 18, 30 is to control the ink resolution printed indicia on the composite papers 10, 22 and 28. It should be noted that the term "absorbent" as used herein refers not only specifically to absorption, but also is intended to include adsorption. The type of bonding which occurs during the printing process is dependent upon the particular compositions which are employed and the composition of the ink-absorbent particulate material employed can be either absorption or adsorption, and most commonly is a combination of both absorption and adsorption.

The layers 18, 30 of ink-absorbent particulate composition which are formed on the surfaces of the thermoplastic films 14, 24 are characterized by being highly porous and having an open structure. Such an open, porous structure makes an ideal surface for printing much like a paper surface but distinctly different from the smooth, non-porous surfaces of the thermoplastic films 14, 24.

Compositions which are used to apply the ink-absorbent layers 18, 30 are comprised of a major portion of a finely divided particulate material. Particulate materials of the same chemical type and particle size ranges as are used for applying coatings to conventional paper are usable in the manufacture of the composite papers 10, 22 and 28 of the present invention. Some of the typical particulate materials which can be employed include for example clays, zeolites, aluminum carbonate, calcium carbonate, titanium dioxide, satin white zinc oxide, barium sulfate and mixtures thereof.

In addition to the particulate material, the ink-absorbent particulate composition also contains a minor amount of a binder which is present in an amount that is sufficient to bond the particulate material to the surface of the thermoplastic film. The binders which can be used include water soluble adhesives, such as glues, gums, starches, and casein for applications where the final product will not be required to resist high amounts of moisture. It is preferable, however, to use water resistant synthetic polymeric materials such as carboxylate styrene, butadiene copolymers, acrylic acid butadiene copolymers, polyacrylate esters, polyvinyl acetate copolymers, acrylic acid vinyl acetates, and styrene acrylic acid copolymers.

The ink-absorbent particulate composition is typically comprised on a dry solid basis of from about 10 to 25 parts by weight of the binder to about 100 parts by weight of the particulate material.

The precise amount of the ink absorbent composition which is required to be applied to the thermoplastic film is dependent on the particular composition which is used as well as the amount and type of inks which is anticipated to be applied in the printing process. The amount which is applied need only be that amount which is effective in absorbing the printing ink. In practice it was found that satisfactory results are obtained when the amount of the ink absorbent composition applied to the thermoplastic film is about 2 to 10 pounds per 3,000 square feet of coated surface.

The composite paper of the present invention can be manufactured using conventional manufacturing techniques and apparatus. The paper which is to be used as the paper substrate is typically provided in the form of an appropriate size roll. The paper web is preferably initially subjected to flame treatment to remove extraneous surface fibers and to oxidize the surface to make it more chemically reactive. The paper web then is preferentially subjected to a corona treatment to impart desired electrical charge properties to the paper so as to improve its affinity for the thermoplastic film.

The thermoplastic film is then applied to the surface. This can be accomplished by various well known techniques. Most preferably the required thermoplastic film is extrusion or co-extrusion coated or alternatively gauged with a blade to form a smooth film on the surface of the paper. Alternatively, the thermoplastic film can be applied by lamination using either adhesion bonding or thermal bonding to adhere the film to the surface of the paper. If desired, the thermoplastic film can be applied to both surfaces of the plastic web.

The ink absorbent particulate composition is then applied by a conventional means to the plastic film and dried as required. The ink absorbent composition can be applied with an air knife, a blade coater, a roll rod, a brush or other similar techniques conventionally used in the manufacture of ordinary clay coated paper.

Other well-known finishing techniques such as calendering can be employed to tailor the final surface to achieve such properties as gloss or additional smoothness, but are not required as part of this invention.

The composite papers of this invention have the general appearance of a high quality coated paper. In printing processes the composite paper of this invention is used in essentially the same manner as conventional coated papers. As is borne out by the example that is described herein below, the printing results which are obtained are at least equivalent to those obtained with the conventional coated paper and often the results are superior particularly with regard to resolution of the printed indicia.

A sample of 100-pound white tag bleached board was first coated with polyethylene terphthalate (PET), at a rate of about 13 pounds per 3,000 square feet of coated surface, using conventional extrusion coating equipment. The resulting composite was subsequently coated with an ink absorbent particulate composition as follows:

| | |
|---|---|
| 100 parts | Hydrogloss 90 (#1 clay) |
| 18 parts | Tylac 0246 (SBR) |
| 0.4 parts | Kelgin |
| 0.45 parts | Resinset 656-4 |
| 0.04 parts | Biocide D3T-A |
| 0.051 parts | Defoamer DF177 |

With the above components comprising approximately 50% solids, the Brookfield viscosity (at 100 rpm) of such ink absorbent particulate composition was about 266 centipoise.

The PET/board composite sample was then coated with the ink absorbent particulate composition, at a rate of about 5 pounds per 3,000 square feet of coated surface, and at a speed of about 400 feet per minute. After such coating process, the clay/PET/board composite sample was next dried using two hot air dryers at a temperature of approximately 375° F. The dried sample then was gloss calendered at 350° F. and 500 PLI using a single nip #8 P&J backing roll.

When compared to a sample of conventional tandem clay coated board of similar weight (e.g., Frankote ®, a coated board product sold by Union Camp Corporation, Wayne, N.J.), the clay/PET/board composite sample met or exceeded in seven categories the quality of such tandem clay coated board as shown in Table I below, where "Sample A" is the gloss calendered clay/PET/board composite sample and "Sample B" is the tandem clay coated board.

TABLE I

| | Sample A | Sample B |
|---|---|---|
| GEB brightness (%) | 81.7 | 80.1 |
| Gloss (%) | 67.2 | 65.0 |
| PPS, S-10 (μm) | 2.0 | 1.65 |
| Prufbau ink gloss (%) | 72.2 | 71.3 |
| IGT pick (kp · cm/S) | 43.2 | 45.5 |
| Concora scoreability (%) | 94.5 | 91.7 |
| WVTR (g/100 cm$^2$/24 hrs) | 5.23 | — |

It should be noted that a measurement of the WVTR of the tandem clay coated board could not be determined due to the high amount of water permeation and buckling of the board that was experienced during the tests.

Unlike the conventional papers of the prior art, the composite papers of this invention are exceptionally stable. The composite papers are not adversely affected by moisture penetration from the polymer side and have excellent grease and oil resistance as well as superior physical properties similar to the prior art plastic coated paper products which could not be effectively printed.

For example, in a relative ranking of six samples of various boards utilizing the Parker Print Smoothness (S-10) and Prufbau Ink Gloss (75°) tests as standards for comparison, the gloss calendered clay/PET/board and clay/PET/board composites in accordance with the present invention finished first and third, respectively. Only a gloss calendered, air knife clay coated bleached board sample compared favorably, finishing second in the overall rankings. The three samples above all finished ahead of a bleached board sample, a PET-coated bleached board sample, and an air knife, clay-coated bleached board sample.

What has been obtained in accordance with this invention is a balanced composite paper product having desirable properties of paper, the desirable properties of plastic films and in addition having the ability to be printed with high resolution patterns.

What is claimed is:

1. A composite paper, comprising:
    a paper substrate having first and second opposing surfaces;
    a first continuous thermoplastic film having opposed inner and outer surfaces, said inner surface of said first continuous thermoplastic film being adhered to the first surface of said paper substrate; and
    a first layer of an ink absorbent particulate composition bonded to said outer surface of said first continuous thermoplastic film, whereby said first layer is printable through application of ink in patterns to an outer surface thereof.

2. The composite paper according to claim 1, further comprising:
    a second continuous thermoplastic film having opposed inner and outer surfaces, said inner surface of said second continuous thermoplastic film being adhered to said second surface of said paper substrate.

3. The composite paper according to claim 2, further comprising:
    a second layer of an ink absorbent particulate composition bonded to said outer surface of said second continuous thermoplastic film, whereby said second layer is printable through application of ink in patterns to an outer surface thereof.

4. The composite paper according to claim 1, wherein said paper substrate comprises a Kraft paper.

5. The composite paper according to claim 1, wherein said paper substrate comprises a bleached Kraft paper.

6. The composite paper according to claim 1, wherein said paper substrate has a basis weight of from at least about 20 pounds per 3,000 square feet.

7. The composite paper according to claim 1, wherein said first continuous thermoplastic film comprises an extruded or co-extruded in place film.

8. The composite paper according to claim 1, wherein said first continuous thermoplastic film is at least about 0.15 mils thick.

9. The composite paper according to claim 1, wherein said first continuous thermoplastic film is about 0.5 to about 1.5 mils thick.

10. The composite paper according to claim 1, wherein said inner surface of said first continuous thermoplastic film is conformal to said first surface of said paper substrate, and said outer surface of said first continuous thermoplastic film is substantially planar.

11. The composite paper according to claim 1, wherein said first continuous thermoplastic film comprises a thermoplastic resin selected from the group consisting of polyamides, polyvinyl chlorides, polyesters, polyolefins and mixtures thereof.

12. The composite paper according to claim 1, wherein said first continuous thermoplastic film comprises a polar resin or is made up of two or more coextruded films the outer layer of which comprises a polar resin.

13. The composite paper according to claim 1, wherein said first continuous thermoplastic film comprises polyethylene terphthalate.

14. The composite paper according to claim 1, wherein said first continuous thermoplastic film comprises:
    a thermoplastic resin; and
    a member selected from the group consisting of pigments, binders, fillers, viscosity modifiers, crosslinking agents, dispersions, dyes, lubricants and mixtures thereof.

15. The composite paper according to claim 1, wherein said first continuous thermoplastic film is applied in an amount of from about 2 to 30 pounds per 3,000 square feet.

16. The composite paper according to claim 1, wherein said ink absorbent particulate composition comprises from about 80% to about 90% by weight of one or more particulate materials.

17. The composite paper according to claim 16, wherein said one or more particulate materials are selected from the group consisting of clays, zeolites, silicas, aluminum carbonate, calcium carbonate, titanium dioxide, satin white, zinc oxide, barium sulfate and mixtures thereof.

18. The composite paper according to claim 1, wherein said ink absorbent particulate composition comprises:
  from about 80% to about 90% by weight of particulate material; and
  from about 10% to about 20% by weight of a binder, said binder being present in an amount sufficient to bond said particulate material to said outer surface of said first continuous thermoplastic film.

19. The composite paper according to claim 1, wherein said ink absorbent particulate composition comprises from about 10 to 25 parts by weight of binder per 100 parts by weight of particulate material.

20. The composite paper according to claim 1, wherein said ink absorbent particulate composition is formed in a substantially uniform thickness amount on the outer surface of the thermoplastic film in an added on amount of about 2 to 10 pounds per 3,000 square feet.

* * * * *